(12) United States Patent
Xifra

(10) Patent No.: US 7,076,910 B1
(45) Date of Patent: Jul. 18, 2006

(54) FLASH LANDING AND CONTROL DEVICE

(76) Inventor: Jorge Xifra, Luis Morales 935, Asunción (PY)

( * ) Notice: Subject to any disclaimer, the term of this patent is extended or adjusted under 35 U.S.C. 154(b) by 0 days.

(21) Appl. No.: 10/849,104

(22) Filed: May 18, 2004

(51) Int. Cl.
 A01K 97/00 (2006.01)
 B66C 1/28 (2006.01)

(52) U.S. Cl. .................. 43/4; 43/5; 294/109; 294/115; 177/148; 177/232; 177/245; 33/485; 33/511; 269/6; 269/237; 24/503; 24/505

(58) Field of Classification Search ............... 43/4, 43/5, 53.5; 294/19.3, 115, 109, 110.1, 119.1, 294/16, 22, 100, 116; 177/126, 131, 148, 177/225, 232, 233, 245; 33/484, 485, 511; 269/6, 3, 237, 238, 239; 24/502, 503, 505, 24/506, 598.5, 598.6

See application file for complete search history.

(56) References Cited

U.S. PATENT DOCUMENTS

| | | | | |
|---|---|---|---|---|
| 54,007 | A * | 4/1866 | O'Neil | 177/148 |
| 172,954 | A * | 2/1876 | Beeman et al. | 294/115 |
| 207,204 | A * | 8/1878 | Payson | 177/131 |
| 218,329 | A * | 8/1879 | Stivers | 33/485 |
| 356,540 | A * | 1/1887 | Joel | 269/3 |
| 418,742 | A * | 1/1890 | McFeely | 33/485 |
| 452,278 | A * | 5/1891 | McIlvaine | 43/5 |
| 465,069 | A * | 12/1891 | Reid | 294/19.3 |
| 479,718 | A * | 7/1892 | Morgan et al. | 177/232 |
| 503,042 | A * | 8/1893 | Glynn | 177/225 |
| 597,958 | A * | 1/1898 | Cotner | 294/115 |
| 602,569 | A * | 4/1898 | Turner | 24/115 F |
| 626,052 | A * | 5/1899 | Carter | 177/131 |
| 697,894 | A * | 4/1902 | Shiley | 177/148 |
| 735,003 | A * | 7/1903 | Ward | 177/245 |
| 755,726 | A * | 3/1904 | Ward | 43/5 |
| 820,383 | A * | 5/1906 | Ashland | 24/598.5 |
| 876,213 | A * | 1/1908 | Moore | 177/131 |
| 886,003 | A * | 4/1908 | Kraft | 294/19.3 |
| 952,552 | A * | 3/1910 | Weldon | 177/232 |
| 953,731 | A * | 4/1910 | Adler | 24/598.5 |
| 966,676 | A * | 8/1910 | Farrell | 294/115 |
| 1,000,868 | A * | 8/1911 | Williams | 24/598.5 |
| 1,031,917 | A * | 7/1912 | Dennison | 177/245 |
| 1,049,875 | A * | 1/1913 | Krueger | 43/5 |
| 1,056,343 | A * | 3/1913 | Kromann | 43/5 |
| 1,059,083 | A * | 4/1913 | Smallwood | 177/148 |
| 1,183,428 | A * | 5/1916 | Burns | 177/148 |
| 1,186,142 | A * | 6/1916 | Steiner | 177/148 |
| 1,255,269 | A * | 2/1918 | Zinkiewiez | 177/232 |
| 1,262,974 | A * | 4/1918 | Pearen | 24/598.5 |
| 1,299,821 | A * | 4/1919 | Carpmill et al. | 24/598.5 |
| 1,453,301 | A * | 5/1923 | Winkler | 294/22 |
| 1,464,232 | A * | 8/1923 | Beam | 177/131 |

(Continued)

FOREIGN PATENT DOCUMENTS

CA 509737 A * 2/1955 ................. 43/5

(Continued)

Primary Examiner—Darren W. Ark

(57) ABSTRACT

A device for landing, handling and controlling a fish which includes a pair of clamps pivotally attached to a main housing. A handle is provided at one end of the housing. The clamps can be moved from a closed position to a fully opened position by a trigger assembly. The clamps can be retained in their fully opened position without manual assistance. The device can be provided with a built in scale. A locking assembly can also be provided for preventing the main housing from spinning or rotating with respect to the handle.

13 Claims, 17 Drawing Sheets

U.S. PATENT DOCUMENTS

| | | | | |
|---|---|---|---|---|
| 1,518,205 A | * | 12/1924 | Kountz | 177/232 |
| 1,665,661 A | * | 4/1928 | Glessale | 294/19.3 |
| 1,684,322 A | * | 9/1928 | Itjen | 24/598.5 |
| 1,692,325 A | * | 11/1928 | Bellile et al. | 294/19.3 |
| 1,941,064 A | * | 12/1933 | Wendt | 294/115 |
| 1,949,452 A | * | 3/1934 | Chadwick | 43/4 |
| 2,003,893 A | * | 6/1935 | La Pan | 177/148 |
| 2,193,073 A | * | 3/1940 | Norton | 294/100 |
| 2,263,965 A | * | 11/1941 | Fiori | 43/53.5 |
| 2,289,810 A | * | 7/1942 | Tallmadge | 43/53.5 |
| 2,378,570 A | * | 6/1945 | Mitchell | 294/116 |
| 2,446,720 A | * | 8/1948 | Rominski | 177/232 |
| 2,458,811 A | * | 1/1949 | Von Koscielski | 177/245 |
| 2,533,230 A | * | 12/1950 | Dixon | 294/110.1 |
| 2,553,235 A | * | 5/1951 | Brace | 294/19.3 |
| 2,570,538 A | * | 10/1951 | Fincher et al. | 177/245 |
| 2,579,812 A | * | 12/1951 | Fisher et al. | 294/19.3 |
| 2,584,881 A | * | 2/1952 | Johnson et al. | 294/19.3 |
| 2,595,989 A | * | 5/1952 | Smeltz | 43/53.5 |
| 2,603,474 A | * | 7/1952 | Mandolf et al. | 177/233 |
| 2,630,314 A | * | 3/1953 | Cadwallader | 43/53.5 |
| 2,643,151 A | * | 6/1953 | Zupancic | 43/53.5 |
| 2,690,927 A | * | 10/1954 | Bean | 177/245 |
| 2,747,321 A | * | 5/1956 | Thompson | 43/53.5 |
| 2,750,184 A | * | 6/1956 | Warndahl | 177/232 |
| 2,817,556 A | * | 12/1957 | White | 294/116 |
| 2,852,302 A | * | 9/1958 | Steffen | 294/115 |
| 2,853,336 A | * | 9/1958 | Cruikshank et al. | 294/115 |
| 2,894,782 A | * | 7/1959 | Puckett et al. | 294/110.1 |
| 2,930,648 A | * | 3/1960 | Allan | 43/5 |
| 2,994,622 A | * | 8/1961 | Miller | 177/245 |
| 3,013,517 A | * | 12/1961 | Isham | 24/598.5 |
| 3,014,257 A | * | 12/1961 | Huffman | 24/598.5 |
| 3,041,102 A | * | 6/1962 | Day | 294/19.3 |
| 3,051,521 A | * | 8/1962 | Skowron | 294/110.1 |
| 3,288,513 A | * | 11/1966 | Behrick | 294/19.3 |
| 3,395,768 A | * | 8/1968 | Benbow | 177/225 |
| 3,514,892 A | * | 6/1970 | Wormsbecker | 43/53.5 |
| 3,521,396 A | * | 7/1970 | Allen | 43/53.5 |
| 3,743,042 A | * | 7/1973 | Hilterhaus | 177/233 |
| 3,833,252 A | * | 9/1974 | Redding | 294/19.3 |
| 3,848,689 A | * | 11/1974 | Hilterhaus | 177/148 |
| 3,986,745 A | * | 10/1976 | Langguth | 294/119.1 |
| 4,281,461 A | * | 8/1981 | Roe | 177/126 |
| 4,660,666 A | * | 4/1987 | Reder et al. | 177/148 |
| 4,783,926 A | * | 11/1988 | McKinney et al. | 43/5 |
| 4,845,876 A | | 7/1989 | Dodson | 43/5 |
| 4,934,089 A | * | 6/1990 | Samar | 43/5 |
| 4,995,188 A | * | 2/1991 | Ewing | 177/225 |
| 5,092,074 A | * | 3/1992 | Zincke | 43/53.5 |
| 5,119,585 A | * | 6/1992 | Camp | 43/53.5 |
| 5,243,147 A | * | 9/1993 | Johnson | 177/245 |
| 5,248,177 A | * | 9/1993 | Jones et al. | 294/116 |
| 5,430,914 A | * | 7/1995 | Patterson et al. | 24/598.5 |
| 5,545,855 A | * | 8/1996 | Stanfield et al. | 177/148 |
| 5,593,197 A | * | 1/1997 | Mathieu et al. | 294/116 |
| 5,606,782 A | * | 3/1997 | Patterson et al. | 24/598.5 |
| 5,637,838 A | * | 6/1997 | Arey et al. | 177/148 |
| 5,746,464 A | * | 5/1998 | Paul | 294/116 |
| 5,854,447 A | * | 12/1998 | Greenwood et al. | 177/148 |
| 5,867,877 A | * | 2/1999 | Patterson et al. | 24/598.5 |
| 5,921,015 A | * | 7/1999 | Newell et al. | 24/503 |
| 5,922,999 A | * | 7/1999 | Yang | 177/148 |
| 5,938,259 A | * | 8/1999 | Sawdon et al. | 294/116 |
| 5,944,236 A | * | 8/1999 | Cinque | 24/503 |
| 5,986,222 A | * | 11/1999 | Helberg | 177/148 |
| 6,038,808 A | * | 3/2000 | Bergeron et al. | 43/53.5 |
| 6,264,544 B1 | * | 7/2001 | Mullins | 177/126 |
| 6,429,391 B1 | * | 8/2002 | Gruver | 177/148 |
| 6,438,891 B1 | * | 8/2002 | Aboczky | 43/53.5 |
| 6,547,296 B1 | * | 4/2003 | Perkitny et al. | 294/16 |
| 6,560,913 B1 | * | 5/2003 | Liao | 43/5 |
| 6,571,505 B1 | * | 6/2003 | Poiencot, Jr. | 43/5 |
| 6,608,261 B1 | * | 8/2003 | Thadani | 177/126 |
| 6,696,650 B1 | * | 2/2004 | Muller et al. | 43/4 |
| 6,765,155 B1 | * | 7/2004 | Gray | 43/4 |
| 6,766,609 B1 | * | 7/2004 | Aboczky | 43/53.5 |
| 6,769,212 B1 | * | 8/2004 | Grayson | 43/4 |
| 6,943,304 B1 | * | 9/2005 | Brady et al. | 43/5 |
| 2002/0017048 A1 | * | 2/2002 | Lam | 43/4 |
| 2004/0163267 A1 | * | 8/2004 | Bini | 33/511 |
| 2005/0189153 A1 | * | 9/2005 | Yang | 43/5 |

FOREIGN PATENT DOCUMENTS

| | | | | | |
|---|---|---|---|---|---|
| FR | 958971 A | * | 9/1949 | | 43/5 |
| FR | 960942 A | * | 11/1949 | | 43/5 |
| GB | 1567278 A | * | 5/1980 | | 43/5 |
| NO | 55577 A | * | 8/1935 | | 43/5 |

* cited by examiner

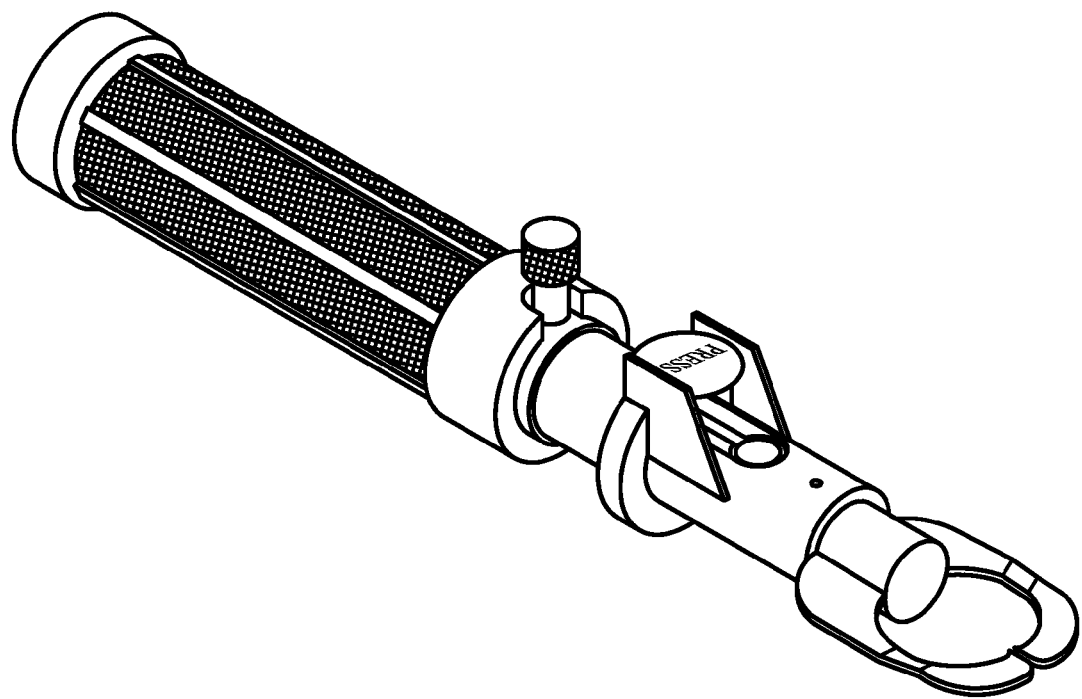
FIG. A

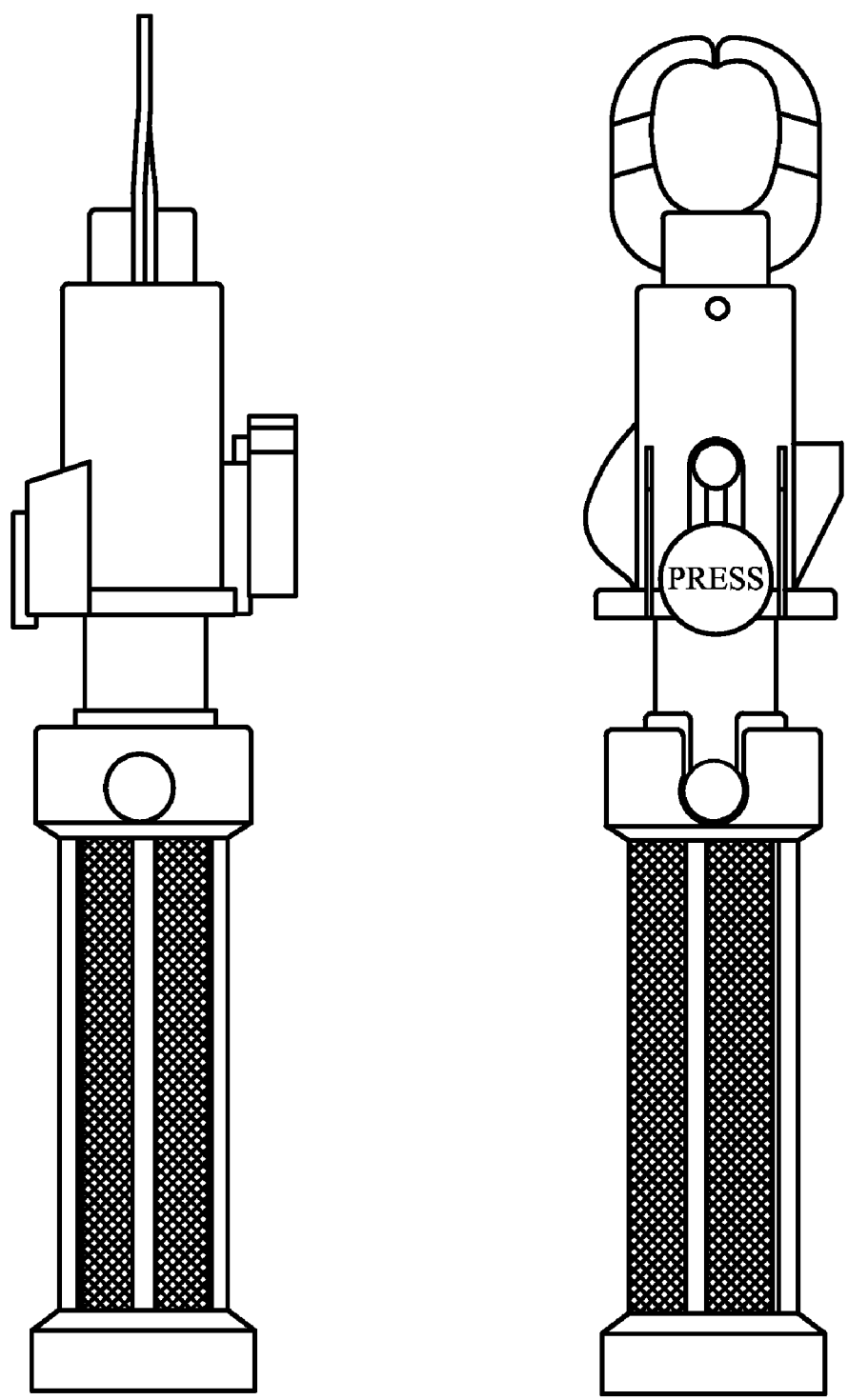
FIG. B

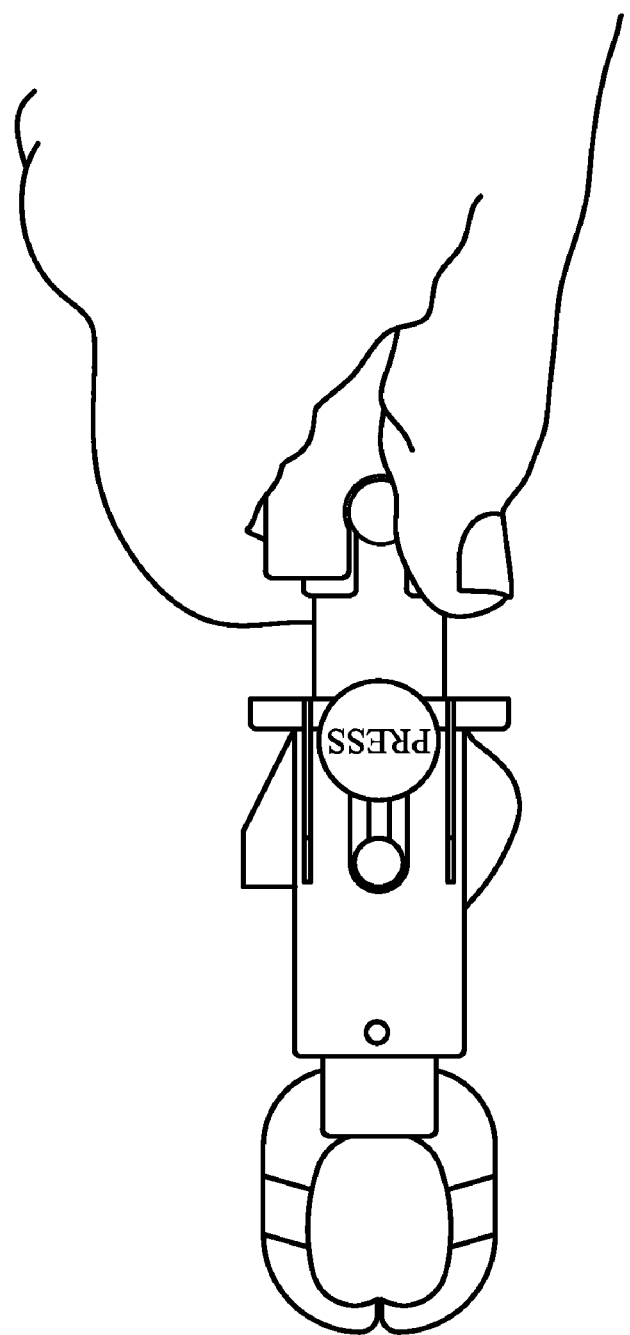
FIG. C

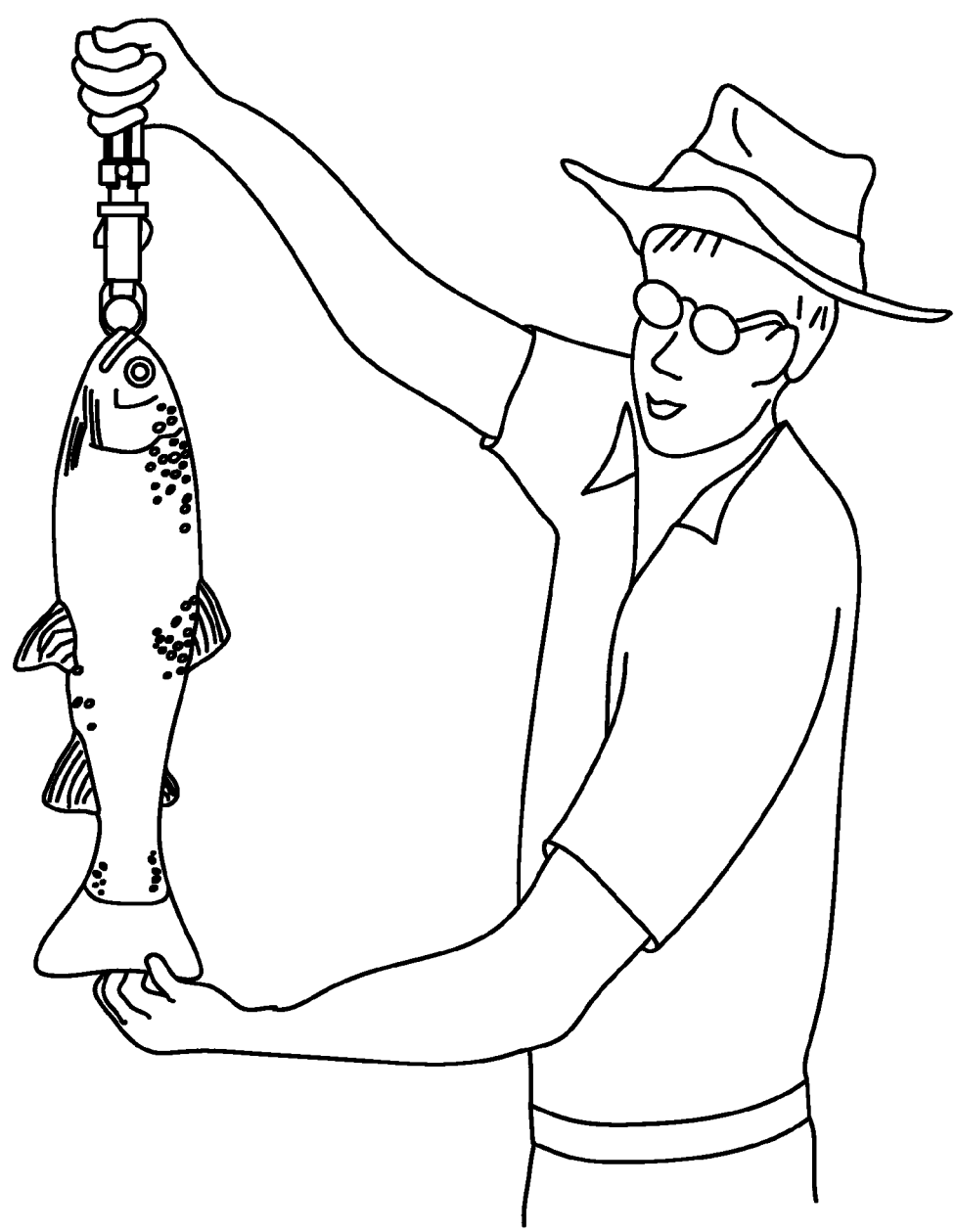
FIG. D

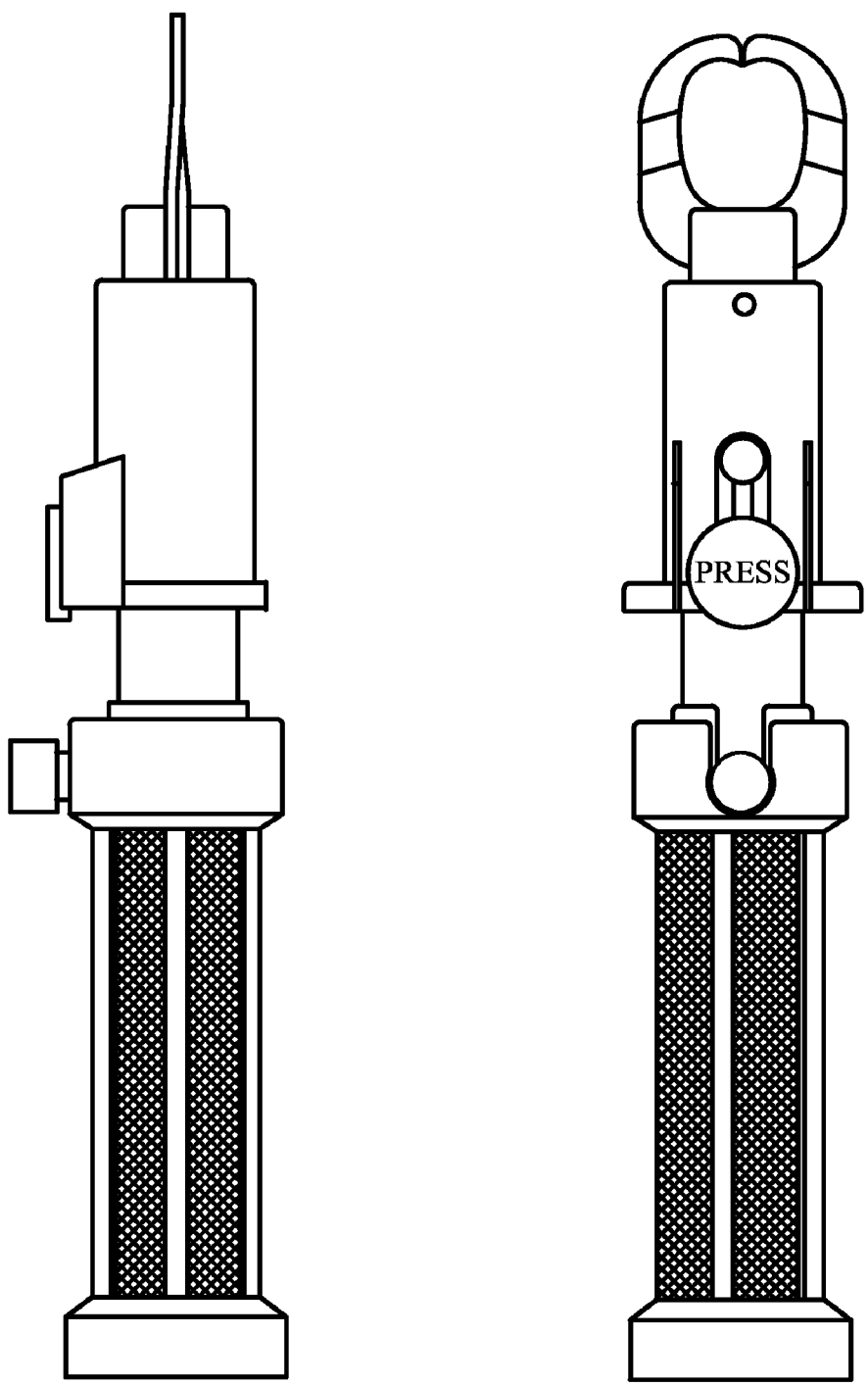
FIG. E

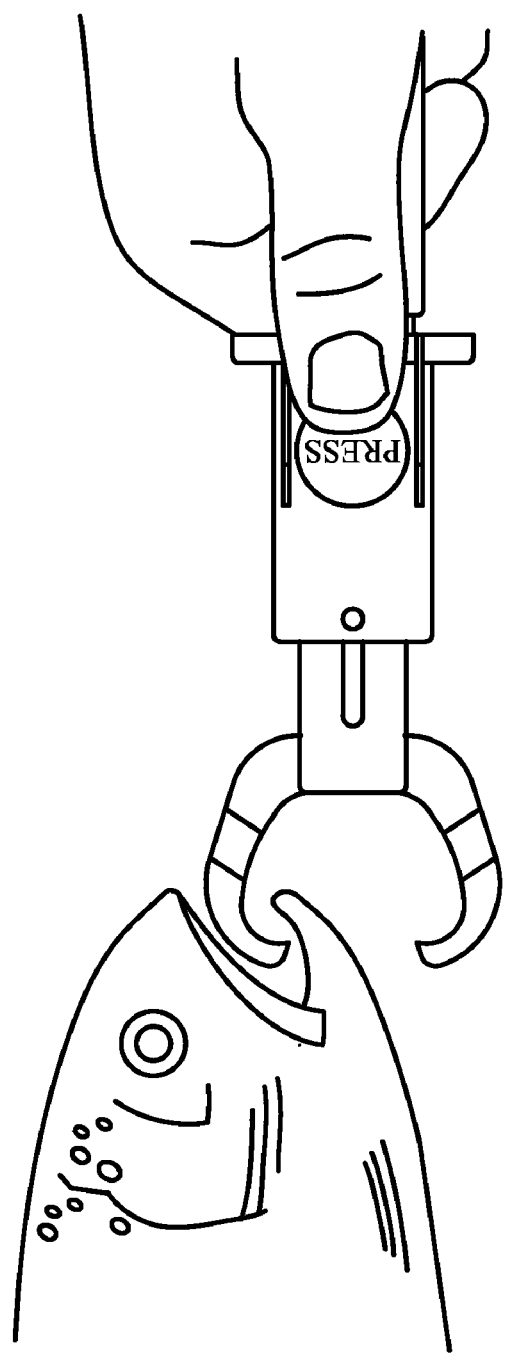
FIG. F

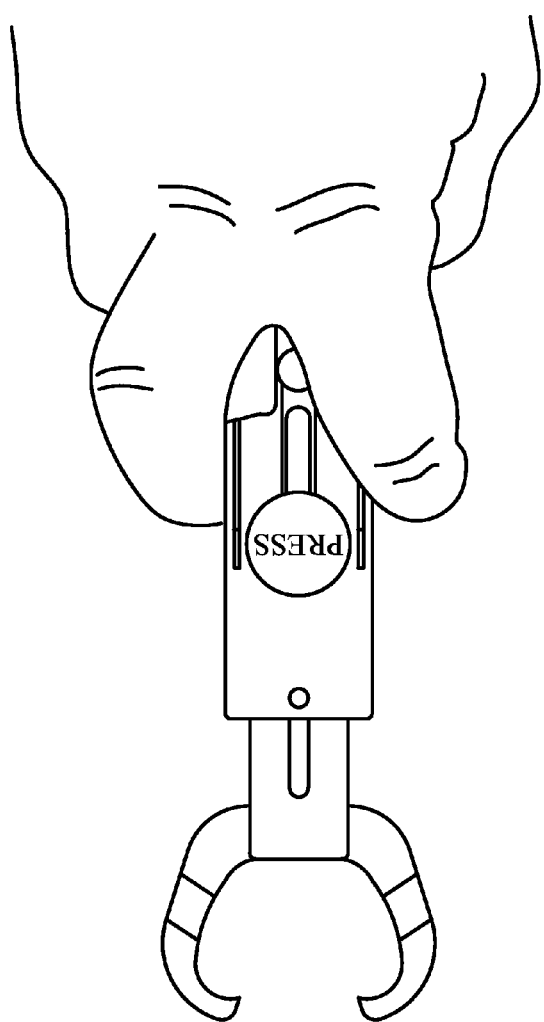
FIG. G
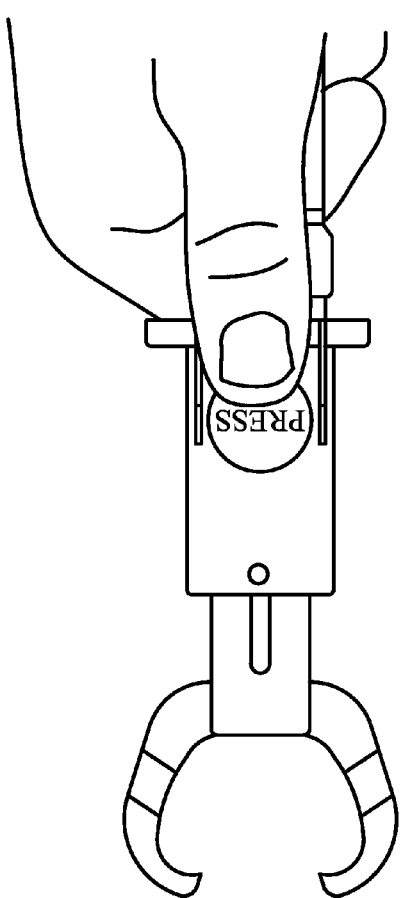
FIG. H

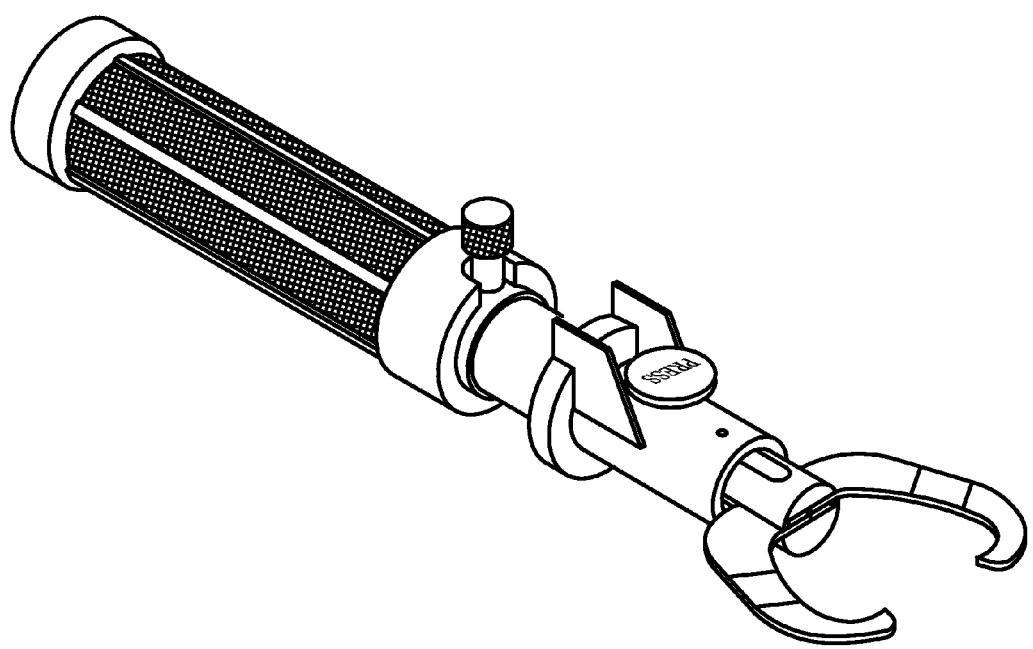
FIG. I

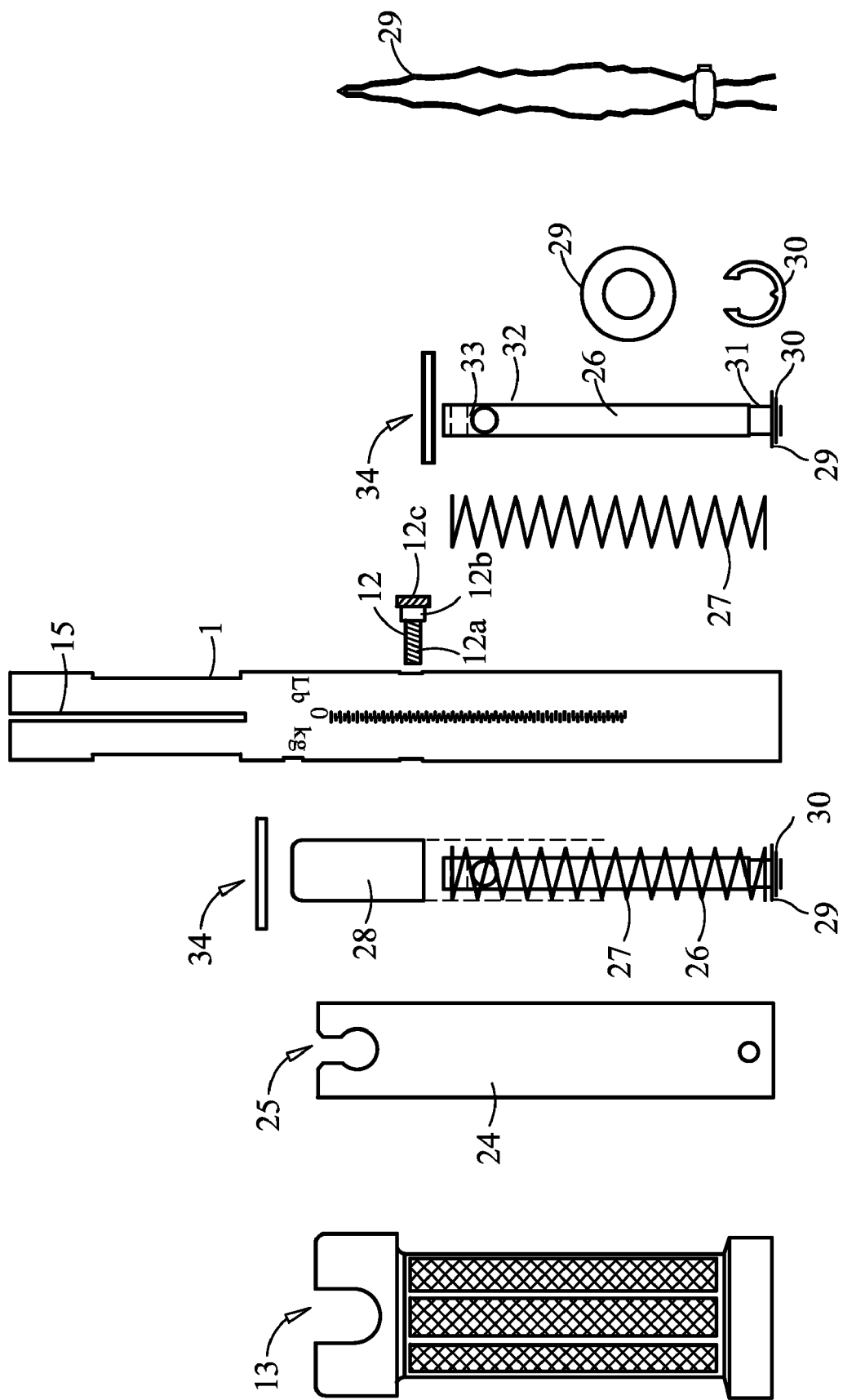
FIG. J

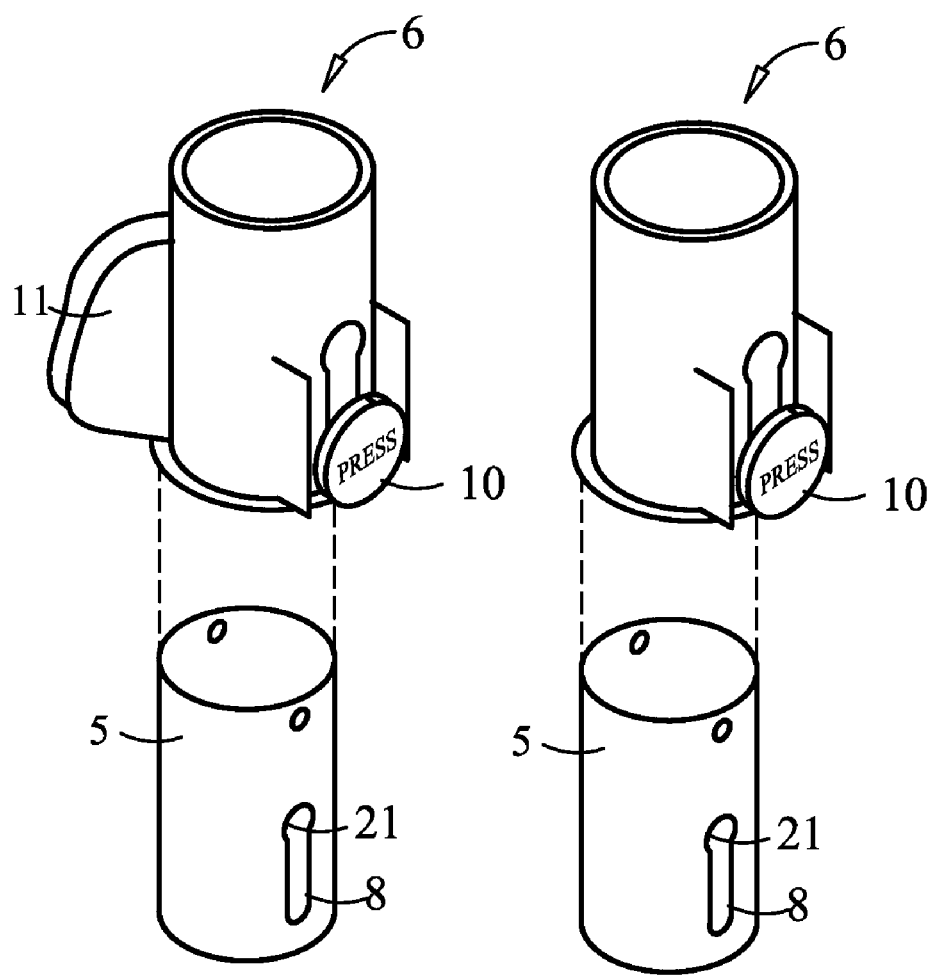
FIG. K

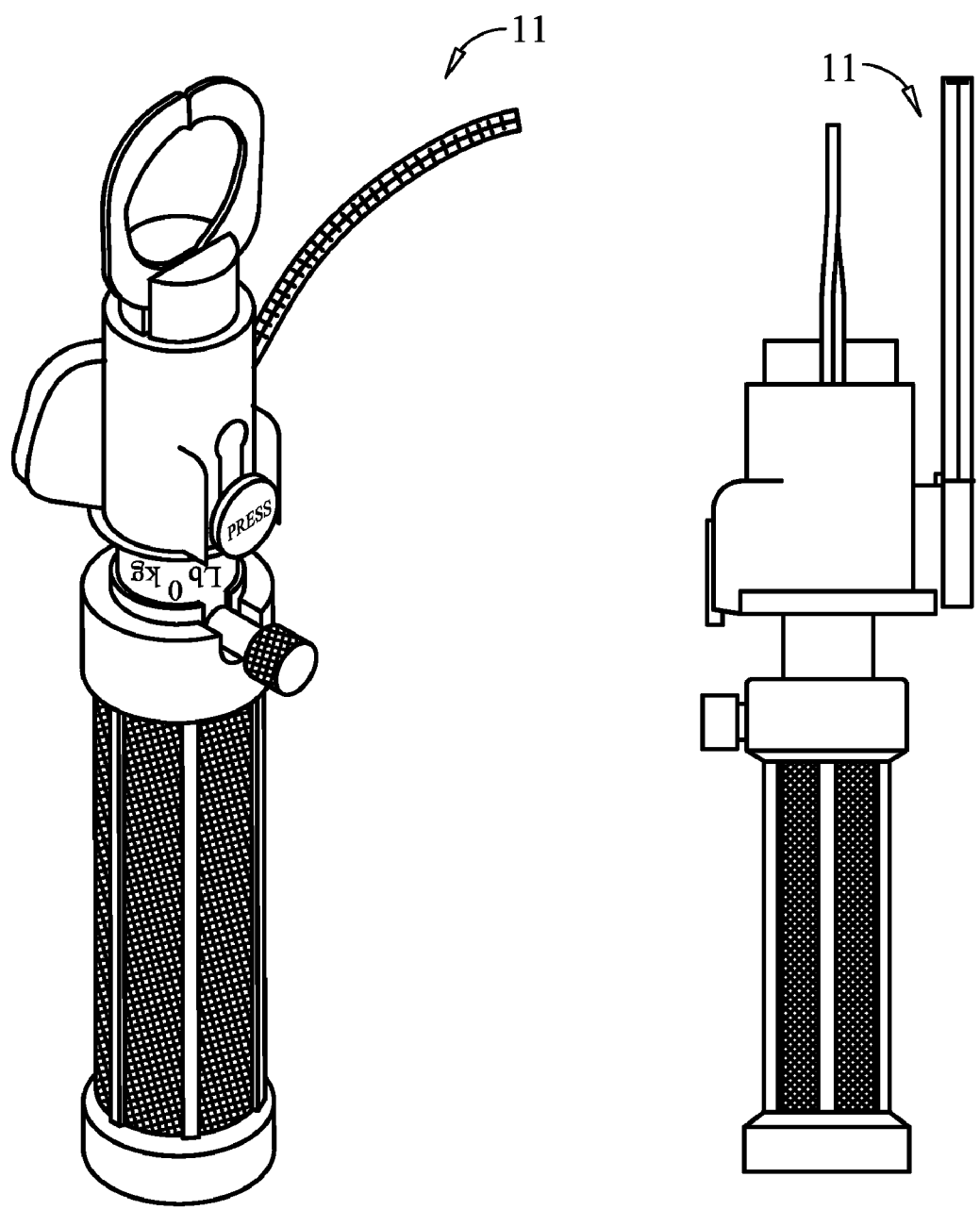
FIG. L

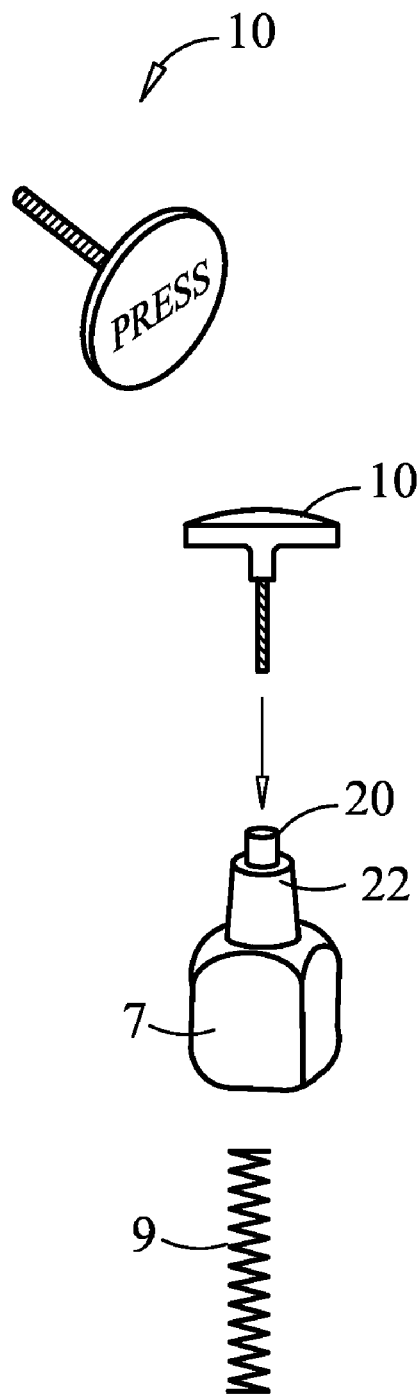
FIG. M

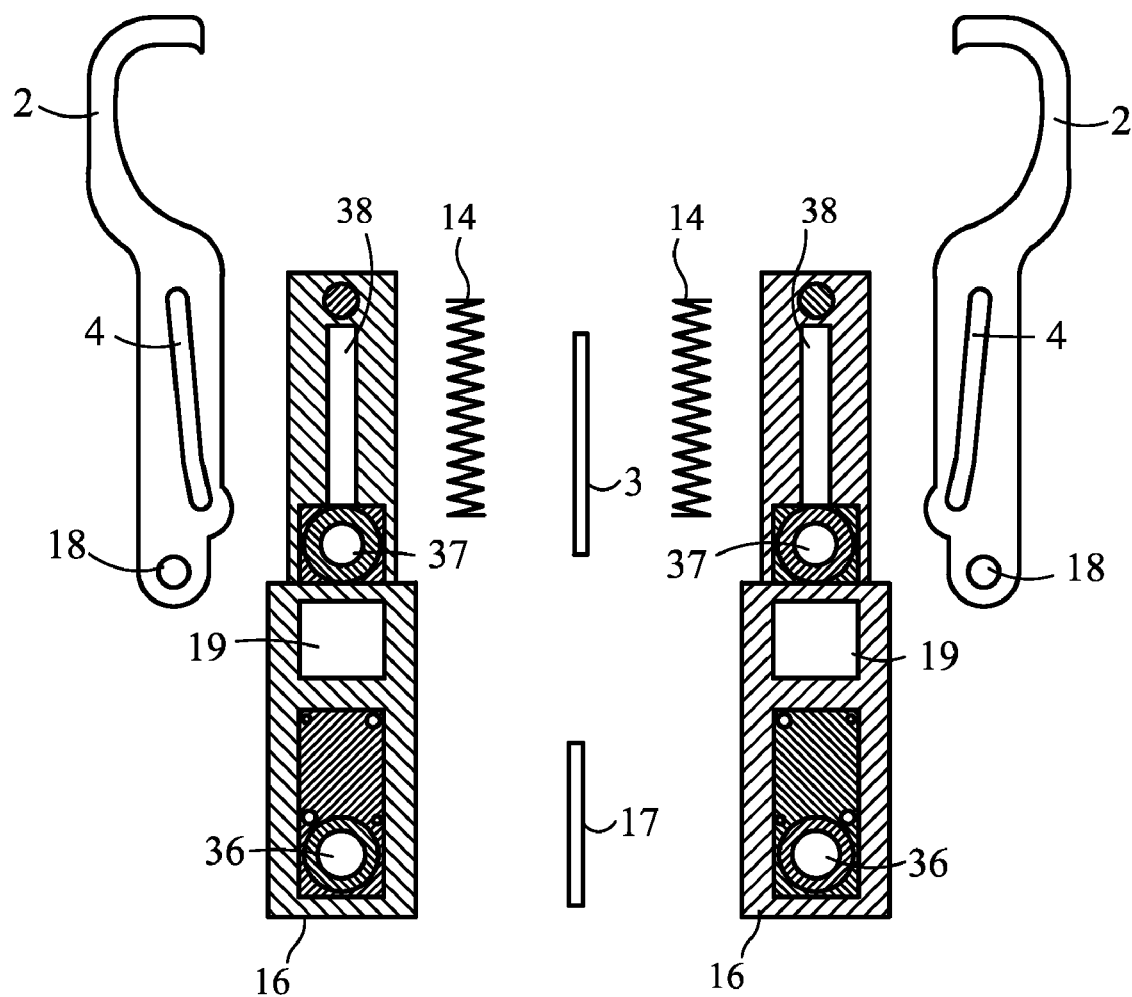
FIG. N

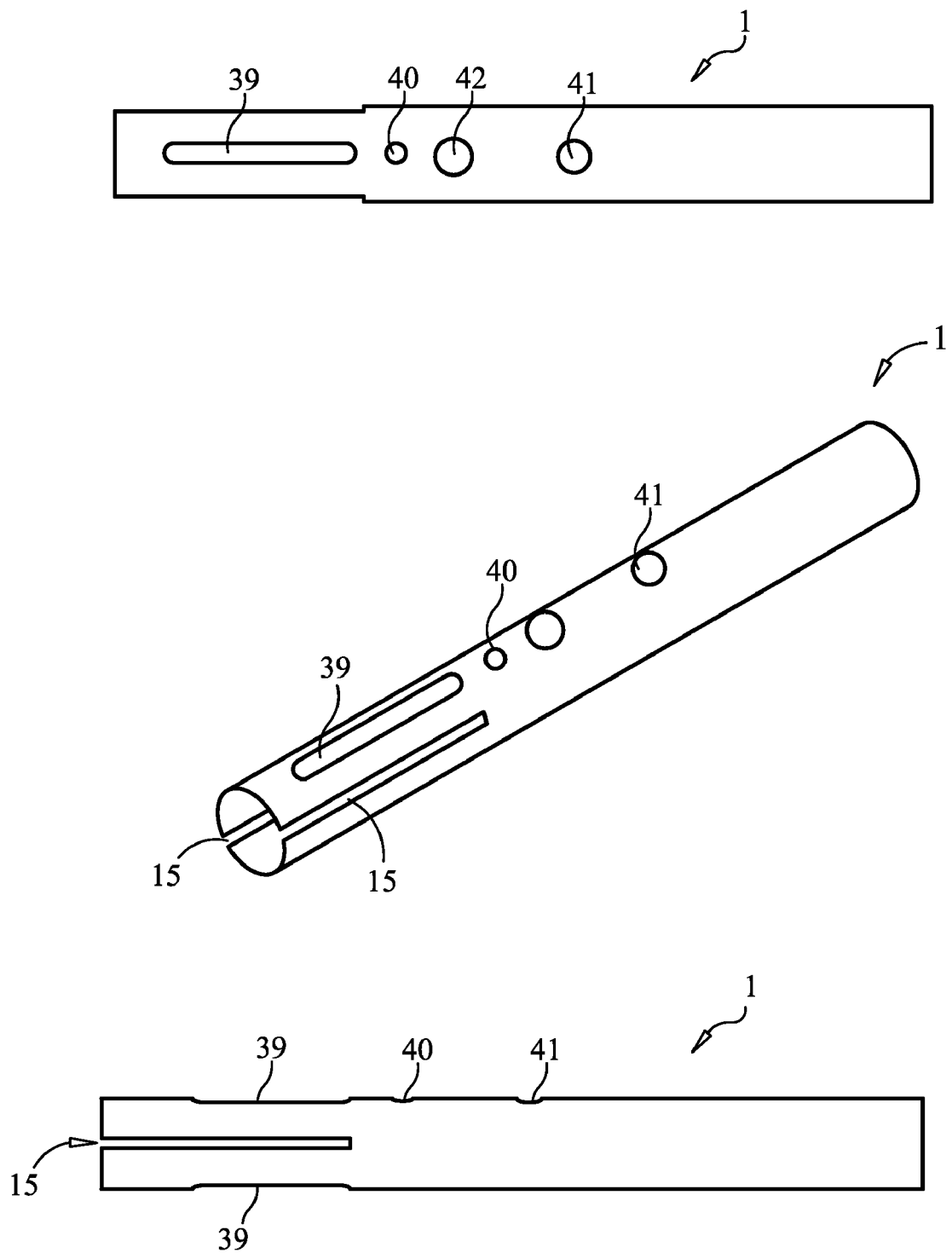
FIG. O

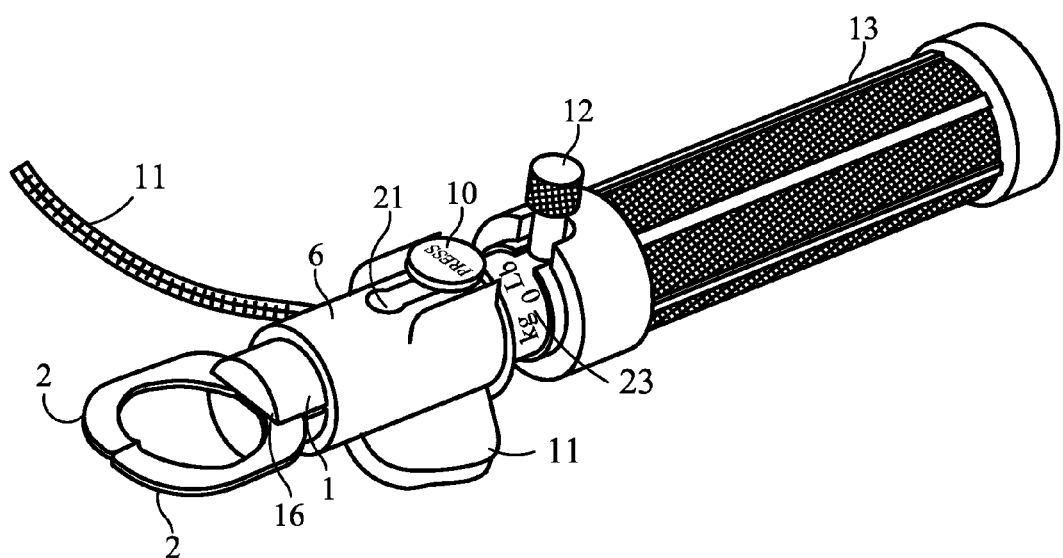
FIG. P

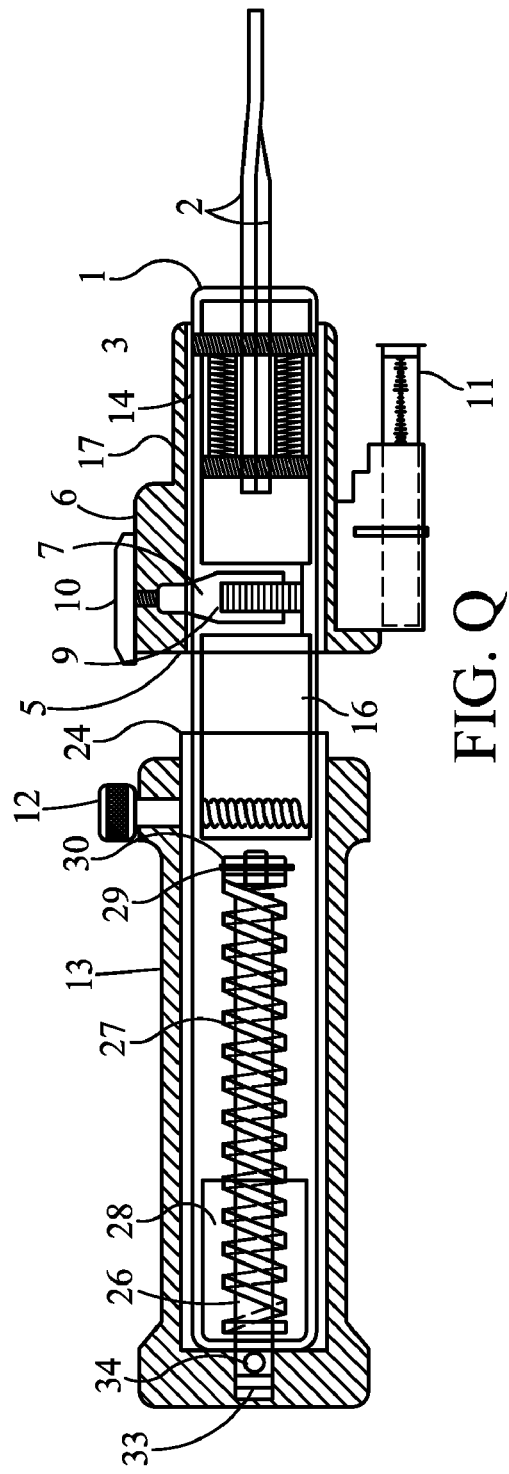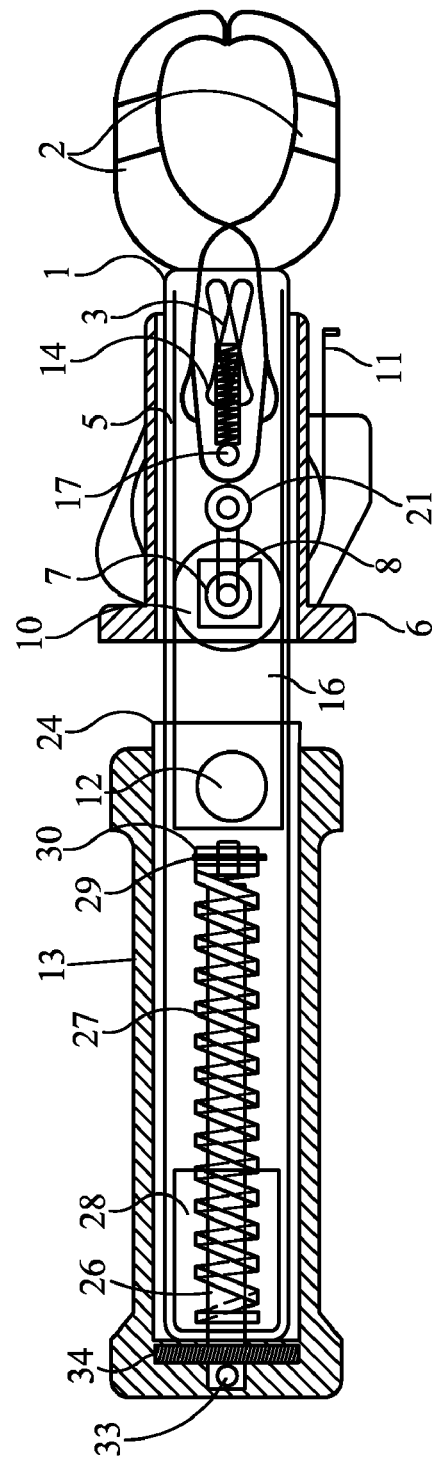
FIG. Q
FIG. R

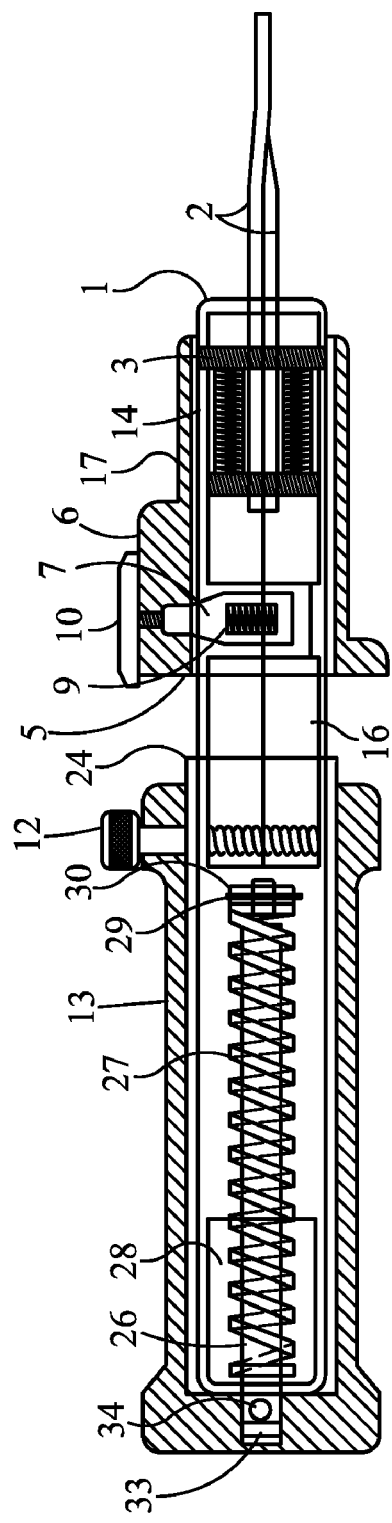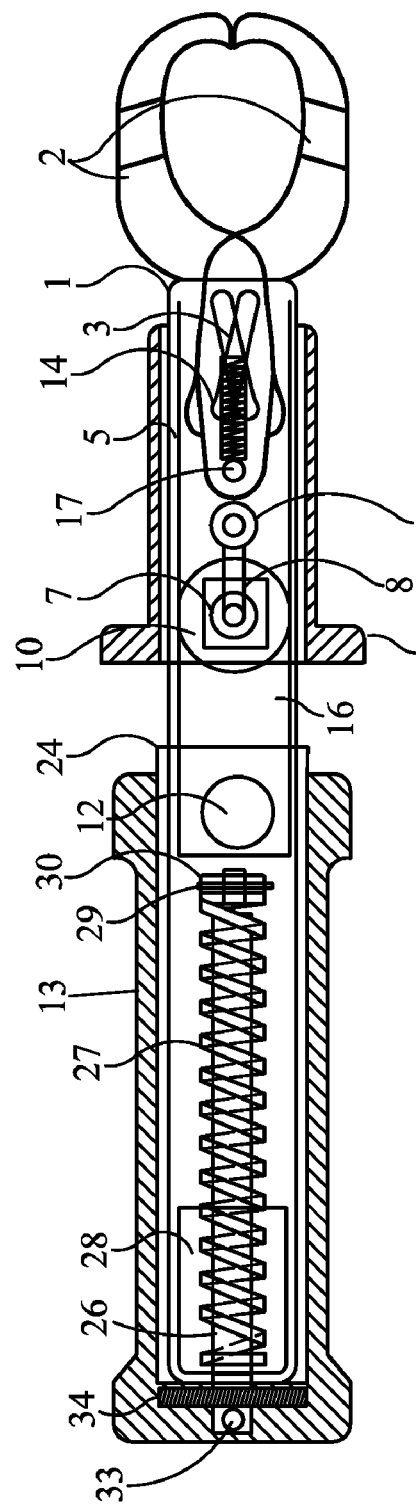
FIG. S
FIG. T

FLASH LANDING AND CONTROL DEVICE

FIELD OF THE INVENTION

The present invention relates generally to the field of fishing and more particularly to a device for lifting and controlling a fish out of the water.

BACKGROUND OF THE INVENTION

Fish handling tools or devices are well known, with the product covered by U.S. Pat. No. 5,119,585 to Camp being a popular device sold in the marketplace. Previous devices are commonly are designed to hold the fish utilizing jaws that when pulled down by the weight of fish, react by applying more pressure which can cause injury to the captured fish.

Additionally prior methods of handling a fish that is intended to be released include the use of nets, gaffs, tail wires that can hurt the fish's scales or skin. Additionally, all fish hand released can be exposed to contamination, and may die after infections, due to the loss of the protective mucus and/or from gill infections. Scientific research has shown proven that hand handling of released fish, often results in the fish dying after few days due to infections and diseases. There is also a lack of information readily available for teaching men or women how to properly handle fish to be released, including avoiding the fish contact with the earth, sand, wood on boats, floors, etc. when the fish is laid to be measured.

It is to the effective resolution of the above problems, as well as others, that the present invention is directed.

SUMMARY OF THE INVENTION

The present invention provides a device for the unharmed lifting and controlling of a fish out of the water, such as, but not limited to, a fish caught during the sport of angling, for scientific purposes, etc. The device can provide for lifting and hands-free handling or controlled of a captured fish, to permit for relatively easy removal of hook or for freeing from nets or other fish capturing devices. Though not limiting, the present invention device can be helpful for handling and controlling captured fish that are intended to be released back to the water, unharmed, after being measured and/or weighed for any known or unknown purpose.

In a preferred embodiment, the device can include a tubular housing, such as a stainless steel pipe, provided with two clamps that move similar to the clamping members of conventional pliers. (i.e. in an at least somewhat parallel motion, without retrieving or reducing the clamping distance or area defined by the two clamps and the housing. The clamps can be constructed from stainless steel and can be driven open by a shaft pin disposed within a slot. The shaft pin can be attached to a sleeve bushing (preferably constructed from stainless steel) combined with a cover piece (preferably constructed from plastic). When the shaft pin slides backward by the pulling of the cover piece by the operator, a spring operated piece pops outward with respect to the housing to lock the clamps into a open position. This open position allows the operator place the device into the fish's mouth. The clamps stay open inside the fish mouth, which can be mainly into the lower fish's jawbone, until a press button, associated with the spring operated piece, is pressed to cause the clamps to return to a closed position. In the closed position, the clamps hold the fish with a relatively gentle and controlled connection, without injury to the fish, so that the fish can be lifted, measured, photographed and/or weighed.

Measurements can be taken using a built in measure tape, attached to the plastic bushing sleeve, that indicates measurements on inches and metric. In another embodiment, the tape measure can be removably connected to the device.

Weighing of a caught fish is obtained using the built in handle scale. The scale is placed in action by unscrewing a scale locking nut, which permits reading of the fish's weight in pounds and/or kilos. The handle for the device can be provided with an ergonomic grip and a secure hold.

The clamps movement action can be provided by a twin spring operation, opening and closing the clamps in a somewhat parallel fashion, without requiring the fish's weight to hold the tool tightly closed. This feature results in a closing strength that at least substantially avoids any active injury to the attached fish.

The present invention fish controlling device uses two clamps, which close relatively gently regardless of the weight of the fish. The device, with a permanent or removable measuring tape, permits a one hand operation, and a release press button bolt action to keep the clamps open, without operator assistance. This allows the clamps to be placed in the fish's mouth until the operator press the release button to close the clamps for connecting the device to the fish.

The scale built into an ergonomic handle, also has a new feature that keeps the scale action locked, for a better gripping, until the operator decides the use or not of the scale, that reads both pounds and kilos in one operation.

Accordingly, one purpose of the present invention, is to provide to the angler, fishermen, scientist, etc. a device that can be easily used for substantial control of a caught fish, including, but not limited to handling the fish without injury, taking measurements of the fish, effective weighing of the fish, and one hand operation of the device so that hooks or nets can be removed with the other hand to permit the fish to be released unharmed.

Some features of the invention include, but are not limited to, that the clamps of the present invention do not significantly, if at all, increase pressure in the jaws of the fish from the weight of the fish held in the clamps. Additionally, the present device can be provided with a handle having a built-in scale that can be operated unscrewing a scale lock nut to permit for easier and effective weigh readings of the caught fish. Furthermore, the clamps are locked in place and stay open, without user or operator assistance, after being opened by the user, until the user presses the release button and close the clamps properly on the fish's mouth. Once the clamps are closed in place, an active fish does not have any noticeable, if any, additional pressure, regardless of the shaking of the fish which with at least some prior art other devices could cause ripping of the fish's mouth.

The handle of the present invention can be provided with an ergonometric non-slip design for improving control of the caught fish. A lanyard can also be provided for wrist wrap control. In one embodiment, the handle can be designed and constructed from a rubber or rubber composite material, such as a substantially slip proof design and material, to enable the user to hold the fish securely and safety, even in wading or wet hands situations.

The present invention device can be adaptable to a carry on, or saved on a belt sheath prior and after use, and ready for use at any moment or environment.

BRIEF DESCRIPTION OF THE DRAWING

FIG A shows a perspective view of a fish handling, landing and control device in accordance with the present invention;

FIG B shows front and lateral view of the fish handling, landing and control device having a built-in measuring tape;

FIG C shows an operator, angler, fisherman or other user (all collectively referred to as "user") firmly handling of the device of the present invention;

FIG D shows a user holding the device of the present invention with one hand (and can be also weighing the attached fish at the same time) and is using the measuring tape with the other hand;

FIG E shows front and lateral drawings of the present invention;

FIG F shows the device of the present invention with clamps locked open and the user ready to close the clamps into the fish lower lip using the press button release;

FIG G shows the user using his or her index and forefinger (though other fingers can be used and are considered within the scope of the invention) to pull the sleeve assembly of the device to lock the clamps of the device in their open position;

FIG H shows the user's thumb (though other fingers can be used and are considered within the scope of the invention) ready to close the tool by pressing the press button release assembly of the device;

FIG I shows the clamps of the device locked and retained in their open position without manual assistance;

FIG J shows various parts (though not all parts) of the device in an exploded view;

FIG K shows certain main portions of the sliding sleeve-busing assembly of the present invention device with and without a measuring tape assembly;

FIG L shows a side and lateral view of the device with a portion of the measuring tape removed or pulled out of its housing;

FIG M shows certain parts of the push button release assembly for the present invention device;

FIG N shows an exploded view of portions of the present invention device including the clamps, certain springs, chassis, sliding shaft pin and assembling pin;

FIG O shows several views of the main housing of the present invention device;

FIG P shows another perspective view of the present invention device;

FIG Q shows a first sectional view of present invention including a tape measuring assembly;

FIG R shows a second sectional view of the present invention including a tape measuring assembly;

FIG S shows a first sectional view of the present invention without a tape measuring assembly; and FIG T shows a second sectional view of the present invention without a tape measuring assembly.

DESCRIPTION OF THE EMBODIMENT

As seen in the Figures, and as generally shown in Figures A and B, the present invention fish landing and control device is illustrated and generally designated as fish tool or device 100. Device 100 can include a handgrip or handle 13, which can be ergonomically designed to be firmly held by the hand of the user (i.e. angler, fisherman, etc.). Device 100 is preferably used to grip a fish at its lower jawbone (See FIG F) so that the fish can be lifted, controlled, photographed, weighed and/or measured (See FIG D) in one relatively safe operation. Device 100 then permits the fish to be easily released unharmed back to its environment. Device 100 provides the user with improved control as compared to prior art devices, such as at the moment of placing to connecting portion of device 100 inside the mouth of a caught fish mouth. Once a push button release 10 has been pressed by the user, (See FIG H) clamps 2 are relatively gently placed in a closed position within the fish's lower lip.

In one embodiment device 100 can be provided with a built-in measure tape 11 (See FIG B) that can be used to measure the length of a connected fish in inches, centimeters or any other dimensions. As seen in FIG D while the caught fish is in a hanging position, its length can be measured and at the same time the weight of the fish (pounds, kilos, etc.) can be read using a built-in scale disposed within handle 13, all without the user taking his or her holding hand away from its grip position on handle 13. Built-in measure tape 11 allows the user to immediately or relatively quickly release all fish that are not with measurements required under the laws, regulations, etc. of the jurisdiction or country where the fishing is occurring. However, it should be recognized that device 100 can also be provided without a built-in measuring tape or can be provided with a removable measuring tape that is attached and detached from device by conventional means, such as, but not limited to a clamping band member.

As best seen in FIGS A and J, device 100 can be provided with a housing 1, preferably of a substantially tubular shape, having a handle 13. Handle 13 can be ergonomically designed and can be constructed from a non-slip material, such as, but not limited to, a plastic and rubber composite. A built-in scale can be provided within handle 13. A fish control assembly can be provided which can include a locking nut or screw 12 to keep housing 1 from spinning with respect to handle 13. Thus, the fish control assembly retains handle 13 in a firm position (i.e. without having the handle moving back and forth) for a safe, secured and controlled hold of an active fish held by clamps 2. The fish control assembly prevents housing 1 from spinning with respect to handle 13 (or vice versa), the user is provided with improved control over the caught fish, who when about to be lifted out of the water normally is active and shaking violently in an attempt to get free.

Main housing 1 provides the housing for most of the parts of device 100 once they are assembled. Housing 1 can be constructed from various materials, and in one embodiment, though not limiting, housing 1 can be constructed from stainless steel and is substantially pipe shaped. A first end of housing 1 can be provided with is cuts or slots 15, which all allow clamps 2, when properly attached, to move from their open position to their close position and vice versa. As best seen in FIG O, housing 1 can also be provided with two slots 39. A shaft pin 3, described in detail below, is permitted to move up and down within slots 39. Housing 1 can also include a hole or aperture 40 to secure an assembling pin 17, and another hole or aperture 41 to allow locking nut or screw 12 to be screw into or otherwise connected to aperture 36 (which can be threaded) of an internal chassis 16 (See FIG N).

The two internal chassis 16 can be constructed from various materials which can include but is not limited to plastic. Chassis 16 can be inserted within housing 1, at the first end of housing 1. Each chassis 16 can be provided with a slot 38, in where a portion of shaft pin 3 is disposed and permitted to move up and down. A portion of shaft pin 3 is also disposed within slots 4 of clamps 2 and also permitted to move up and down. The up and down movement of shaft pin 3 is controlled by coil springs 14 which are each also disposed within a corresponding slot 38 of internal chassis 16. The movement of shaft pin 3, up or down, determines the position of clamps 2 (closed or opened). A downward movement of shaft pin 3 within slots 38 and 4 to a bottom "locked" position, causes clamps 2 to open and remain in their "open" position. When push button release 10 is pressed or otherwise activated, shaft pin 3, through springs 14, moves up along slots 38 and 4 to its top position, which causes clamps 2 to remain in their "closed" position.

Each chassis 16 portion can be provided with a hole or aperture 37 for receipt of a pin 17 that can be used to secure chassis 16 to housing 1. Pin 17 can be riveted or otherwise attached to main housing 1 to retain the twin chassis portions 16 in place with respect to housing 1. Additionally, during assembly of device 100, apertures or holes 18 of clamps 2 are also aligned with apertures 37 of chassis 16 so that pin 17 is also used to secure clamps 2 in position.

In the "closed" position, the position of clamps 2 with respect to each other allows their respective slots 4 to be substantially aligned with each other, with shaft pin 3 extending through both slots 4. Shaft pin 3 can be riveted or otherwise attached to a trigger sleeve or bushing 5. Bushing 5 can be constructed from various materials, including but not limited to stainless steel. When bushing 5 is pulled backwards or downwards by the user (See FIG G, using one or more fingers of the user to slide bushing 5 in conjunction with outer sleeve 6). As shaft pin 3 is disposed in slots 4 and attached to bushing 5, the downward movement of bushing 5 with respect to housing 1, also moves pin 3 down along slots 4 causing clamps 2 to open. At the end of the downward travel of bushing 5, push button release 10 pops up or outward, via spring 9 of the push button assembly, to lock trigger sleeve 5 and retain clamps 2 in an "open" position, without manual assistance.

Clamps 2 open and close in a somewhat parallel motion and are driven by the up and down slide action of shaft pin 3 in slots 4 of each clamp 2. A release system (See FIG M) for unlocking clamps 2 from their open position can be included. Release system can include a push button 10 actuated by spring 9. Spring 9 can be positioned at least substantially perpendicular with respect to springs 14, and can be positioned within a chassis spring passageway 19 defined by the two chassis 16 portions. Spring 9 applies outward force on a locking piece 7 which is attached to push button 10, through a small post or section 20 and large post or section 22. Outer sleeve 6 can be connected to sliding trigger bushing 5 by any conventional attachment mechanism. Thus, the movement of outer sleeve 6 also moves trigger bushing 5 along housing 1.

Trigger bushing 5 is provided with a groove 8 with a larger diameter end 21 as compared to the diameter of the remaining portion of groove 8. The diameter of large post 22 of locking piece 7 is larger than the diameter of groove 8, other than at end 21. The diameter of small post 20 is smaller the diameter of groove 8 and extends through groove 8 and is attached to push button 10. Thus, until trigger bushing 5 reaches its bottom/backward position, larger post 22 of locking piece 7 is positioned internally within bushing 5 and forced against the inside wall of bushing 5 by spring 9. However, once at the bottom position, larger post 22 is aligned with groove end 21 whose diameter is larger than the diameter of larger post 22, which, in view of the pushing force of spring 9, causes larger post 22 to pop up or outward through groove end 21. However the bottom most portion 22a can be at least slightly larger in diameter than groove end 21 to retain a portion of locking pies internally within bushing 5. The movement of larger post 22 with respect to groove end 21, locks trigger sleeve bushing 5 in an open clamps position, since the diameter of larger post 22 is larger than the remaining portion of groove 8 and prevents larger post 22 from traveling within the remaining portion of groove 8.

To release clamps 2 from their open position, the user presses or pushes on push button assembly 10, which pushes larger post 22 inward thus aligning smaller post or section 20 of locking piece 7 with groove 8. As the diameter of smaller section 20 is smaller than the diameter of the remaining portion of groove 8, the force of springs 14 automatically force smaller post 20 along the remaining portion of groove 8 until smaller post abuts the end of groove 8 opposite larger groove end 21. As bushing 5 and sleeve 6 are associated with shaft pin 3 which is moved within slots 38 by springs 14, the movement of smaller post 20 along groove 8 also moves bushing 5 and sleeve 6 upward, which also causes shaft pin 3 to move within slots 4 of clamps 2 to move clamps 2 to their closed position.

As discussed above, the trigger assembly for device 100 can include a trigger sleeve bushing 5 in combination with outer sleeve 6. Though not limiting, in one embodiment, bushing 5 can be constructed from stainless steel and outer sleeve 6 can be constructed from plastic. Outer sleeve 6 can be disposed around a majority of bushing 5.

Bushing 6 can include a built-in measuring assembly including measuring tape 11 (See FIG L) which can operation similar to conventional measuring tape assemblies. As mentioned above, stainless steel bushing sleeve 5 can be provided with groove 8 and hole 21 to allow the action of the press button release assembly to work properly and for keeping clamps 2 in an open and locked position (See FIG I). Locking piece 7 can be provided with a threaded opening for screwing press button 10 into the locking piece 7. Other connection mechanisms can also be used and are considered within the scope of the invention. When the press button 10 is pressed or force thereon otherwise applied (See FIG F) locking piece 7 can be moved downward, allowing smaller diameter section 20 to be freed out of hole 21 and slide along groove 8. This movement allows the two chassis springs 14 to move the sleeve bushing assembly (See FIG K) to its uppermost position, thus, driving (moving) shaft pin 3 along slots 4 to close clamps 2 (i.e. close the terminal ends of claims 2). Clamps 2 can have an offset part mounted on a different plane to enable clamps 2 to close evenly and gently.

Other configurations for locking piece 7 can be used and are considered within the scope of the invention. For example, though not limiting, the stem of button 10 can be directly attached to larger post 22 and serve the purpose of smaller post 20. Additionally, other conventional release assemblies for releasing clamps 2 from their locked fully opened position can be used and are considered within the scope of the invention.

Main housing 1 can have graduated indicia 23 engraved or otherwise disposed on its exterior surface and can include numerals on each side of graduated indicia 23 to indicate the weight in pounds on one side and kilos on the other side. Other measuring indicia can also be provided in addition to or as an alternative to the weight in pounds and/or kilos. The numerals can indicate the weight or force when the scale is operated by the angler or user. The handle assembly, which includes the scale components, can consist of two main pieces: (1) housing 24 which can be provided with an opening 25 at one end for receipt of locking nut 12 and outer handle 13. Handle 13 can be made of a plastic/rubber composite for an at least substantially non-slip like operation and housing 24 can be constructed from stainless steel. Other materials can be used and are considered within the scope of the invention.

The edge of housing 24 can indicate (by pointing to the correct number on graduated indicia 23) the weight of the fish once locking nut 12 is unscrewed or at least somewhat loosened, since the pulling caused by the weight of the attached or hanging fish leaves at least a portion of the graduated indicia 23 exposed such that the corresponding weight of the fish can be easily determined. As mentioned above, the exposed graduated indicia 23 reading is the weight of the fish, either in pounds, kilos or some other desired value.

As best seen in FIG J, certain portions of the built in scale are illustrated, when assembled and disposed inside main housing 1. A spring square assembling rod 26 can be inserted within a scale spring 27. A spring cup 28 can be inserted at one end of spring 27 and a calibrating washer 29 can be provided at the other end of the spring square rod 26. Calibrating washer 29 can be locked using a seager safe washer 30 that can fit in a groove 31 at the end of the spring square rod 26. The assembled parts can reside inside of main housing 1. Spring square rod 26 can be provided with two holes 32 and 33 at least approximate to end opposite of seager safe washer groove 31. An assembling pin 34 can be inserted within hole 32 to secure scale handle housing 24 and spring square rod 26 out of main housing 1. Square rod hole 33 can be provided for threading or otherwise attaching safety lanyard 35.

In use, the operator can easily lift and control the fish and weigh the catch with the use of one hand without using the remaining hand to hold the tool and without using the other hand to lift the fish. Device 100 can be provided with an ergonomic rubber/plastic composite handle 13 inserted into the housing 24, making device 100 more slip proof, even in a wet environment and regardless of whether device 100 is used in fresh or salt water.

The trigger sleeve bushing assembly can consist primarily of two pieces (See FIG K) (1) inner sleeve 5, which, though not limiting, can be constructed from of stainless steel and (2) bushing 6 inserted out and preferably at least substantially hiding inner sleeve 5. Though not limiting, bushing 6 can be constructed from plastic. Other materials for inner sleeve 5 and/or bushing 6 can be selected and are considered within the scope of the invention. When the assembly is operated or pulled backwards, shaft pin 3 can be driven downward within slots 4 of one piece clamps 2, causing clamps 2 to open in a somewhat parallel action, which provides the advantage of a wide opening without retraction of the opening when clamps 2 are opened. Clamps 2 can be substantially "C" shaped with legs having slots 4 contained therein. Each clamp 2 is preferably a one piece member (i.e. substantially "C" shaped portion and leg portion constructed integral or monolithically formed with each other, etc.). Shaft pin 3 slide inside corresponding to the direction of the movement of the trigger sleeve bushing assembly for opening and closing of clamps 2 in a somewhat pliers-like action, particularly when closing. As seen in the drawings, slot 4 can be at least slightly angled with respect to the leg portion of the clamp 2. Additionally, the lower portion of each slot 4 can be slightly angled with respect to the remaining portion of slot 4. In addition or alternatively to angling slot 4, the positional relationship between the leg portion and the substantially "C" shaped portion of each clamp 2 can also be slightly angled.

Other trigger assemblies which will move clamps 2 from a closed position to an opened position can be used and are considered within the scope of the invention. Additionally, though not limiting, in one embodiment inner sleeve 5 and outer bushing 6 could be combined into a single piece.

Clamps 2 automatically close, when the user presses press button 10 (See FIG H) to release the trigger sleeve bushing assembly, which causes it move upwards through spring action. The movement of the trigger assembly upwards also moves shaft pin 3 upward within slots 4 to move clamps 2 into their "closed" position. In this position, the trigger assembly locks the legs of clamps 2 and at least substantially avoids or is at least substantially unaffected by any lateral force trying to open clamps 2. This locked closed positioned holds the fish securely, regardless of the pulling pressure or the weight of the fish.

For better control of the attached fish, device 100 can be designed such that main housing 1 can be prevented from spinning with respect to handle 13. In one embodiment, a locking nut, screw, bolt, etc. (collectively referred to as locking nut 12) is movably connected to main housing 1. As seen in FIG J, locking nut 12 can include a smaller diameter portion 12a, a larger diameter portion 12b and a cap portion 12c. Though not shown, cap portion can be the same diameter or part of larger diameter portion 12b as opposed to the illustrated larger cap portion 12c. Though not limiting, locking nut 12 can be threadedly connected to main housing 1. Scale housing 24 can be provided with a slot or opening 25 at a top end of housing 24 having a lower larger diameter or width and an upper smaller diameter or width. Handle 13 can also be provided with a slot at its top end, which when properly assembled, is aligned with opening 25 of housing 24. Depending on how far locking nut 12 is threaded into main housing 1 determines the portion of locking nut 12 positioned within opening 25.

In view of spring tension or force, when locking nut 12 is aligned with opening 25, the spring tension causes locking nut to rest within opening 25 and the slot of handle 13. This position prevents the spinning or rotating of main housing 1 attached to locking nut 12, since horizontal movement of locking nut 12 is substantially or significantly eliminated or reduced by the inner walls of opening 25 and the slot of handle 13. Thus, main housing 1 can only spin or rotate in a complete circle when locking nut 12 is pulled out of its normal position within opening 25 and the handle slot. This pulling can be achieved by the user or by the weight of an attached fish, particularly during weighing of such fish.

The various diameter sizes of locking nut 12 also allow the device from being able to pull locking nut 12 out of opening 25. The tightening of locking nut 12 with respect to main housing 1 causes the larger diameter portion 12b to be positioned within the lower portion of opening 25. However, the diameter or width of portion 12b can be at least slightly larger than the diameter or width of the upper portion of opening 25. Thus, when a user attempts to pull locking nut 12 out of opening 25, the larger diameter or width of portion 12b prevents it from entering the upper portion of opening 25 and prevents locking nut 12 from being pulled out of opening 25. Accordingly, even a hanging fish will not remove locking nut 12 from opening 25 and thus the movement of the fish can be controlled as such movement will not cause main housing 1 from spinning or rotating with respect to handle 13. When it is desired for being able to pull locking nut 12 out of opening 25 (i.e. for weighing the attached fish) locking nut 12 is loosened until its smaller diameter portion 12a is positioned within opening 25. Smaller diameter portion 12a is smaller in diameter or width from the upper portion of opening 25, thus, allowing locking nut 12 to travel through the upper portion and being removed from opening 25. It should be recognized that the handle 13 is not necessarily for preventing spinning or rotating of main housing, since the portion of locking nut 12 aligned with opening 25 determines whether or not locking nut can be moved out of opening 25. Similarly, the slot in handle 13 can be shaped similarly to opening 25 and be used as the restricting opening, particularly, though not limiting, where housing 24 is eliminated (i.e. no built-in scale provided, or the scale components are attached directly to handle 13 and the edge of handle 13 is used for indicating or pointing to the correct weight reading on graduated indicia 23.

Device 100 can also provide better control at the moment of placing and closing clamps 2 that had been locked opened by pulling the trigger sleeve bushing assembly using one or two fingers while the device is held by the remaining fingers of the same hand. The pulling on the trigger sleeve bushing assembly can continue until the spring operated locking part pops up and locks the trigger sleeve bushing in its backwards position to lock clamps 2 open for an accurate driving into the fish mouth FIG F. As mentioned above, the tightening of locking nut 12 within aperture 25 prevents housing 1 from spinning, rotating or significantly swiveling due to the movement of the fish trying to get free. The prevention of housing spinning provides better control over the fish for whatever purpose (e.g. keeping the fish positioned while photograph, for removing a hook from the fish, keeping the fish in an upright position for resuscitating or reviving in the water, etc.).

Thus, present invention can provide a fish handling, landing and control device having the non-limiting advantages of (1) being a semiautomatic device; (2) having a handle with built-in scale; (3) having a measuring tape built-in; (4) having clamps that lock open and are automatically closed upon applying force to a press button release; (5) prevents the fish from spinning the device which can lead to the tangling of the fishing line and other problems, and/or (6) can be used to handle and control a fish without the risk of hand contamination to fish.

The instant invention has been shown and described herein in what is considered to be the most practical and preferred embodiment. It is recognized, however, that departures may be made therefrom within the scope of the invention and that obvious modifications will occur to a person skilled in the art

What is claimed is:

1. A device for landing and controlling a fish, comprising:
a main housing;
a pair of one piece clamps pivotally attached to said main housing;
a trigger assembly movable in a substantially parallel direction with respect to and along a first portion of said main housing for moving said pair of clamps from a normally "closed" position to a fully "opened" position; wherein said clamps are locked in the fully "opened" position and once locked remain locked in the fully "opened" position without manual assistance; and
a release assembly for unlocking said pair of clamps, wherein once released said clamps automatically return to the "closed" position without manual assistance and remain in the "closed" position without manual assistance;
wherein said trigger assembly comprises a slidable outer sleeve disposed along a first portion of said main housing and a shaft pin attached to said external sleeve and extending through said first portion of said main housing and said pair of clamps; wherein said release assembly comprises a bushing disposed between said outer sleeve and said first portion of said main housing and a push button assembly operatively associated with said bushing, said shaft pin extending through said bushing which causes said bushing to move with the movement of said outer sleeve.

2. A device for landing and controlling a fish, comprising:
a main housing;
a pair of gripping members pivotally attached to said main housing;
a trigger assembly movable in a substantially parallel direction with respect to and along a first portion of said main housing for moving said pair of gripping members from a "closed" position to a fully "opened" position; wherein said gripping members are locked in the fully "opened" position and remain locked in the "opened" position without manual assistance; and
a release assembly for unlocking said pair of gripping members, wherein once released said gripping members automatically return to the "closed" position without manual assistance and remain in the "closed" position without manual assistance; wherein movement of said trigger assembly along said first portion of said main housing also causes said release assembly to also move along said first portion of said main housing in a substantially parallel direction to said trigger assembly;
wherein said trigger assembly comprises a slidable outer sleeve disposed along a first portion of said main housing and a shaft pin attached to said external sleeve and extending through said first portion of said main housing and said pair of clamps; wherein said release assembly comprises a bushing disposed between said outer sleeve and said first portion of said main housing and a push button assembly operatively associated with said bushing, said shaft pin extending through said bushing which causes said bushing to move with the movement of said outer sleeve.

3. A device for landing and controlling a fish, comprising:
a main housing;
a pair of one piece clamps pivotally attached to said main housing;
a trigger assembly movable in a substantially parallel direction with respect to and along a first portion of said main housing for moving said pair of clamps from a normally "closed" position to a fully "opened" position; wherein said clamps are locked in the fully "opened" position and once locked remain locked in the fully "opened" position without manual assistance; and
a release assembly for unlocking said pair of clamps, wherein once released said clamps automatically return to the "closed" position without manual assistance and remain in the "closed" position without manual assistance;
wherein a first clamp of said pair of clamps having a first substantially "C" shaped portion and a first leg portion and a second clamp of said pair of clamps having a second substantially "C" shaped portion and a second leg portion; wherein said first clamp pivotally attached to said main housing at a first end of said first clamp associated with said first leg portion and said second clamp pivotally attached to said main housing at a first end of said second clamp associated with said second leg portion; wherein said first leg portion having a first slot and said second leg portion having a second slot and said trigger assembly including a shaft pin disposed within a pair of slots within said main housing and within the first slot of said first leg portion and the second slot of said second leg portion; wherein upon moving said trigger assembly downward along said main housing said shaft pin travels downward within said first slot and said second slot to correspondingly open said first clamp and said second clamp with respect to each other.

4. A device for landing and controlling a fish, comprising:
a main housing;
a pair of clamps pivotally attached to said main housing;
a trigger assembly movable along a first portion of said main housing for moving said pair of clamps from a "closed" position to a fully "opened" position; wherein said clamps are locked in the fully "opened" position and remain locked without manual assistance;
a release assembly for unlocking said pair of clamps, wherein once released said clamps automatically return to the "closed" position without manual assistance;
a handle associated with a second portion of said main housing;
a built-in scale assembly associated with said main housing; and
means for preventing said main housing from rotating with respect to said handle;
wherein a first clamp of said pair of clamps having a first substantially "C" shaped portion and a first leg portion and a second clamp of said pair of clamps having a second substantially "C" shaped portion and a second leg portion; wherein said first clamp pivotally attached to said main housing at a first end of said first clamp associated with said first leg portion and said second clamp pivotally attached to said main housing at a first end of said second clamp associated with said second leg portion;
wherein said first leg portion having a first slot and said second leg portion having a second slot and said trigger assembly including a shaft pin disposed within a pair of slots within said main housing and within the first slot of said first leg portion and the second slot of said second leg portion; wherein upon moving said trigger assembly downward along said main housing said shaft pin travels downward within said first slot and said second slot to correspondingly open said first clamp and said second clamp with respect to each other.

5. The device of claim 4 further comprising a tape measure assembly attached to said trigger assembly.

6. The device of claim 4 wherein said handle is constructed from a substantially non slip material.

7. The device of claim 4 wherein said first clamp of said pair of clamps is a one piece member and said second clamp of said pair of clamps is a one piece member.

8. The device of claim 4 wherein said release assembly is a push button release assembly.

9. The device of claim 4 wherein said main housing having an outer surface; wherein said scale assembly comprising graduated indicia disposed on a portion of the outer surface of said main housing, a scale housing and a spring/rod combination disposed within said main housing.

10. The device of claim 4 further comprising a lanyard disposed approximate to a handle end of said main housing and an adjustable member slidably attached to said lanyard for adjusting the size of a hand receiving portion of said lanyard.

11. The device of claim 4 wherein movement of said trigger assembly along said first portion of said main housing also causes said release assembly to also move along said first portion of said main housing in a substantially parallel direction to said trigger assembly.

12. The device of claim 4 wherein said trigger assembly comprises a slidable outer sleeve disposed along a first portion of said main housing and a shaft pin attached to said external sleeve and extending through said first portion of said main housing and said pair of clamps; wherein said release assembly comprises a bushing disposed between said outer sleeve and said first portion of said main housing and a push button assembly operatively associated with said bushing, said shaft pin extending through said bushing which causes said bushing to move with the movement of said outer sleeve.

13. A device for landing and controlling a fish, comprising:
a main housing;
a pair of clamps pivotally attached to said main housing;
a trigger assembly movable along a first portion of said main housing for moving said pair of clamps from a "closed" position to a fully "opened" position; wherein said clamps are locked in the fully "opened" position without manual assistance;
a release assembly for unlocking said pair of clamps, wherein once released said clamps automatically return to the "closed" position without manual assistance;
a handle associated with a second portion of said main housing;
a built-in scale assembly associated with said main housing; and
means for preventing said main housing from rotating with respect to said handle;
wherein a first clamp of said pair of clamps is a one piece member and a second clamp of said pair of clamps is a one piece member;
wherein said first clamp having a first substantially "C" shaped portion and a first leg portion and said second clamp having a second substantially "C" shaped portion and a second leg portion;
wherein said first clamp pivotally attached to said main housing at a first end of said first clamp associated with said first leg portion and said second clamp pivotally attached to said main housing at a first end of said second clamp associated with said second leg portion;
wherein said first leg portion having a first slot and said second leg portion having a second slot and said trigger assembly including a shaft pin disposed within a pair of slots within said main housing and within the first slot of said first leg portion and the second slot of said second leg portion; wherein upon moving said trigger assembly downward along said main housing said shaft pin travels downward within said first slot and said second slot to correspondingly open said first clamp and said second clamp with respect to each other.

* * * * *

UNITED STATES PATENT AND TRADEMARK OFFICE
CERTIFICATE OF CORRECTION

PATENT NO. : 7,076,910 B1
APPLICATION NO. : 10/849104
DATED : July 18, 2006
INVENTOR(S) : Jorge Xifra It is certified that error appears in the above-identified patent and that said Letters Patent is hereby corrected as shown below:

On Title Page Item (54) Col. 1

The title of the invention should read: FISH LANDING AND CONTROL DEVICE

On Title Page Item (74) Col. 2 should read,

Attorney, Agent or Firm: Daniel S. Polley, P.A.

Signed and Sealed this

Fourteenth Day of November, 2006

JON W. DUDAS
*Director of the United States Patent and Trademark Office*